Feb. 28, 1956 M. HARTL 2,736,566
SAFETY SEAT CONSTRUCTION FOR VEHICLES
Filed March 25, 1953 5 Sheets-Sheet 1

INVENTOR.
MAX HARTL
BY

Feb. 28, 1956            M. HARTL            2,736,566
SAFETY SEAT CONSTRUCTION FOR VEHICLES
Filed March 25, 1953            5 Sheets-Sheet 2
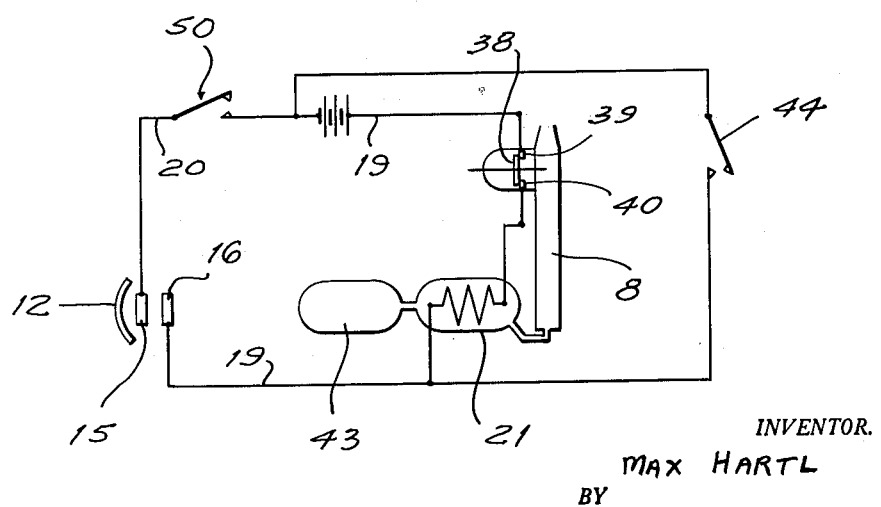
INVENTOR.
MAX HARTL Feb. 28, 1956 M. HARTL 2,736,566
SAFETY SEAT CONSTRUCTION FOR VEHICLES
Filed March 25, 1953 5 Sheets-Sheet 3
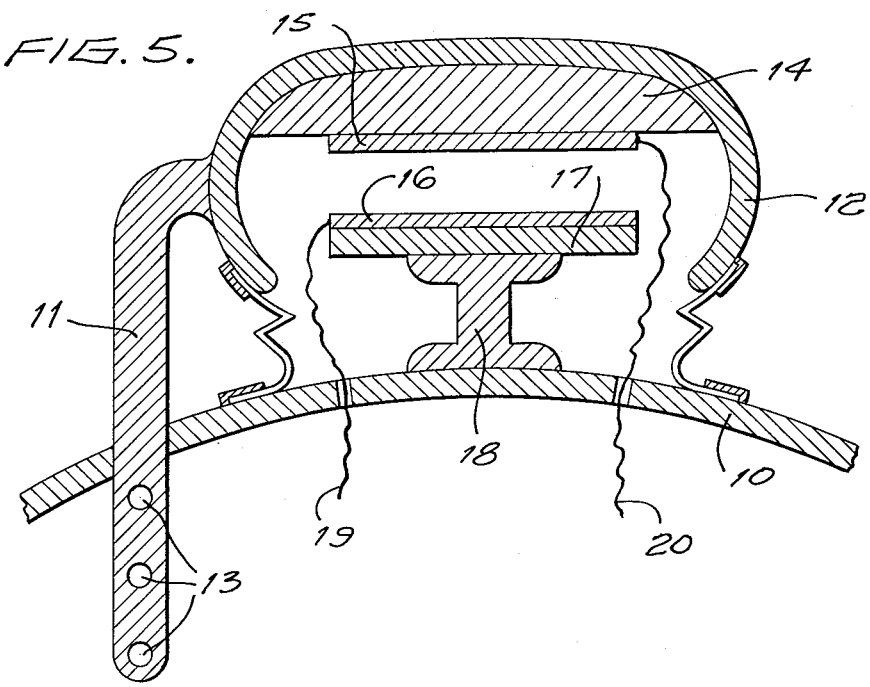
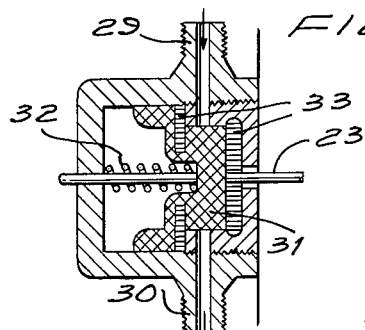
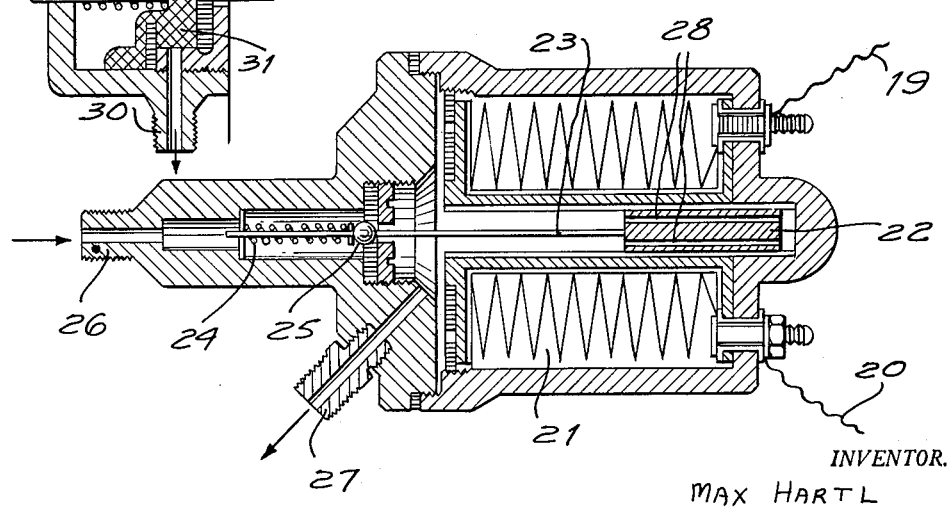
INVENTOR.
MAX HARTL
BY

INVENTOR.
MAX HARTL
BY

Feb. 28, 1956 M. HARTL 2,736,566
SAFETY SEAT CONSTRUCTION FOR VEHICLES
Filed March 25, 1953 5 Sheets-Sheet 5

INVENTOR.
MAX HARTL
BY

United States Patent Office 2,736,566
Patented Feb. 28, 1956

2,736,566

SAFETY SEAT CONSTRUCTION FOR VEHICLES

Max Hartl, Haar-Munich, Germany

Application March 25, 1953, Serial No. 344,525

16 Claims. (Cl. 280—29)

The present invention relates to a safety apparatus for vehicles.

More particularly, the present invention relates to that type of safety apparatus which prevents an occupant of a vehicle from being hurled forwardly from his seat when a collision takes place. Although many devices of this general type have been provided, none of them have thus far proved to be satisfactory in all respects because none of them absolutely prevent the movement of a person from his seat when a collision occurs.

One of the objects of the present invention is to provide an apparatus which guarantees that a person in a vehicle will not be hurled forwardly when a collision occurs.

Another object of the present invention is to provide a means for locating the seat of the vehicle, automatically or at will, at such a position that the forward movement of the person will be prevented by the seat itself.

A further object of the present invention is to provide a safety apparatus of the above type which takes advantage of the weight distribution of the person sitting on a seat.

An additional object of the present invention is to provide a movable seat which moves into one position when a collision occurs, to protect a person sitting on the seat, and which is capable of moving back to its normal position after a relatively short period of time.

A still further object of the present invention is to provide a safety apparatus which operates with a fluid under pressure.

Yet another object of the present invention is to provide a simple and effective means for controlling the flow of the fluid when a collision occurs.

Still another object of the present invention is to provide an apparatus capable of accomplishing all of the above objects while at the same time being made up of relatively few, simple and ruggedly constructed parts which provide a very reliable operation.

With the above objects in view, the present invention mainly consists of a safety apparatus for vehicles, this safety apparatus including a seat having a front part and a rear part, a back rest located adjacent the rear part of the seat and being separate therefrom, support means supporting the seat for turning movement about an axis adjacent the forward part thereof, and raising means for raising this axis to turn the rear part of the seat downwardly above this axis when the moving speed of the vehicle is suddenly retarded so as to locate the seat more distant from the back rest to provide an appreciable space between the back rest and the seat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a transverse sectional view of the structure of Fig. 1 as seen from the left side thereof and taken just to the rear of the front part of the seat;

Fig. 4 is a wiring diagram of the electrical apparatus forming part of the present invention;

Fig. 5 is a sectional, fragmentary view of an electrical release mechanism associated with the bumper of the vehicle to release the safety apparatus for operation when a collision occurs;

Fig. 6 is a partly diagrammatic, sectional view of a valve and solenoid control therefor, the structure of Fig. 6 controlling the release of a fluid pressure medium;

Fig. 7 is a fragmentary sectional view of a different type of a control valve structure;

Figure 1:
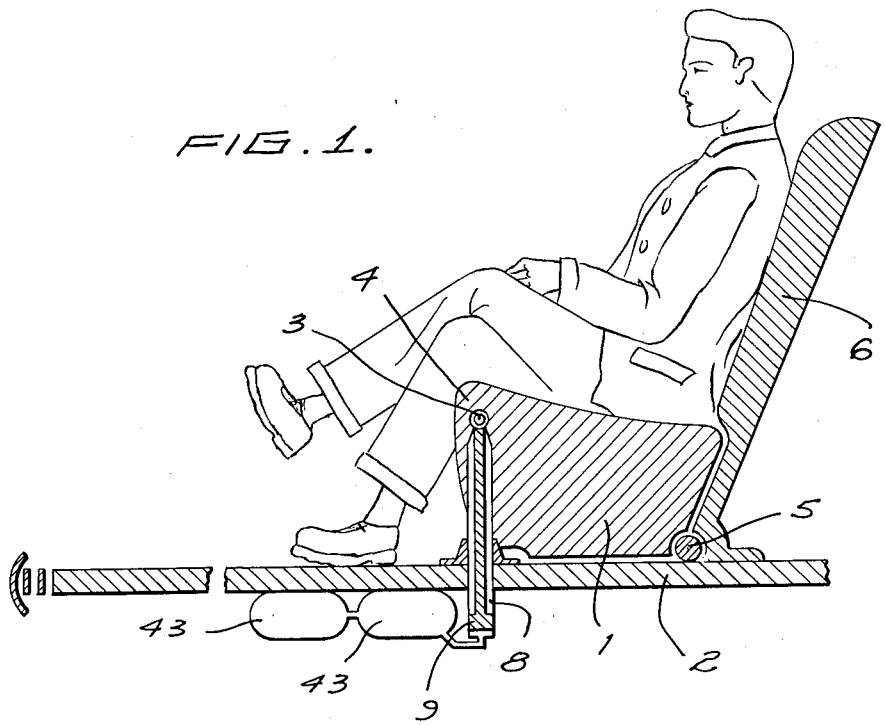
Fig. 1 is a fragmentary, sectional, schematic, elevational view of an apparatus constructed in accordance with the present invention and shown in its normal position.
Figure 2:
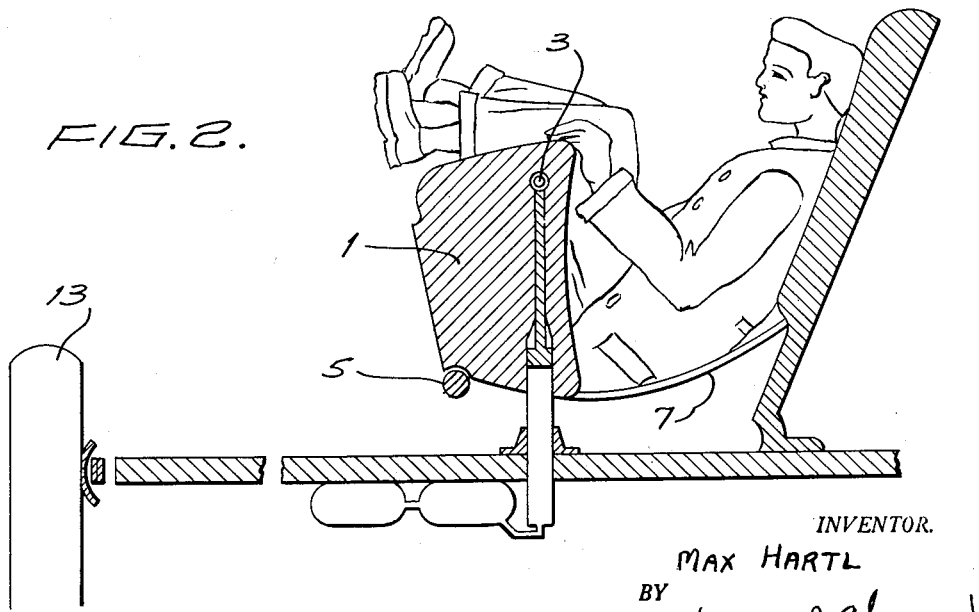
Fig. 2 is a view of the structure of Fig. 1 shown in the position to which it moves when a collision occurs.

Referring now to the drawings, and in particular to Figs. 1–3, it will be seen that instead of the seat of the vehicle being joined to the floor thereof as is conventional, the seat 1 of the present invention only rests against the floor 2 and is not fixedly connected thereto. The seat 1 is turnable about the shaft 3 whose axis extends along the front top portion 4 of the seat 1. This shaft 3 also serves as a support for the front part of the seat whose rear part is provided with a roller or rollers 5, or the like, so that the lower rear part of the seat 1 may move forwardly along the floor 2 of the vehicle. The seat 1 also is separate from the back rest 6, and between and connected to the back rest 6 and the rear part of the seat 1 there is a length of sheet material 7 (Fig. 2) which may be made of cloth or the like, this sheet material 7 being loose when the seat is in the position of Fig. 1 and becoming taut when the seat 1 is located at an appreciable distance from the back rest 6, as shown in Fig. 2.

The shaft 3 is adapted to be moved upwardly from the position diagrammatically shown in Fig. 1 to that diagrammatically shown in Fig. 2. When the shaft 3 is raised, the forward portion 4 of the seat 1 rises therewith while the rear part of the seat 1 turns downwardly and about the axis 3 to the position of Fig. 2, the roller or rollers 5 moving along the floor 2 during the first part of this movement. As is apparent from Fig. 2, the seat 1 is raised sufficiently to permit the roller or rollers 5 to leave the floor 2 and rise upwardly away therefrom and to permit the top surface of the seat, as viewed in Fig. 1, to extend in a substantially vertical direction as shown in Fig. 2.

Thus, the person sitting on the seat is placed in the half reclining and half crouching position shown in Fig. 2, and the weight of the person is pressed, by the force of the collison, against the now vertical top surface of the seat so that the person cannot be thrown forwardly. The extent of turning of the seat is limited to the position shown in Fig. 2 by the sheet material 7 or through any suitable catch mechanism, stops, or the like.

It is evident that when the speed of the vehicle is very greatly retarded at the instant a collision occurs, the shaft 3 must be raised upwardly at a faster rate than that at which the person on the seat is hurled forwardly. The required fast upward movement can be imparted to the shaft 3 through various devices such as, for example, springs whose tension is released by the collision, or through other mechanical, hydraulic, explosive, or electromagnetic devices. An electro-pneumatic apparatus has proved to be particularly suitable for this purpose, and such a device is shown in the drawings, this device including a cylinder 8 in which the piston 9 moves to raise the shaft 3, this piston 9 being connected to the shaft 3 in the manner shown in Figs. 1–3. Thus, through proper choice and design of the various parts and through provision of a suitable pressure of the fluid which acts on the piston 9, it is possible to guarantee that the shaft 3 will be raised quickly enough to prevent the person from being thrown forwardly.

Various devices may be provided to set the apparatus into operation upon great retardation of the vehicle speed. Thus, a relay of the retarding force may be provided, for example, a mercury relay device to release a suitable pair of electrical contacts for engagement with each other. It is also possible to provide an electrical contact on the bumper of the vehicle, as shown in Fig. 5, which releases the apparatus for automatic operation. As is shown in Fig. 5 a front portion 10 of the vehicle which is located opposite the bumper 12 carries a support 18 for a member 17 of electrical insulating material on which an electrical contact 16 is mounted, this contact 16 being connected to the lead 19 of an electrical circuit (Fig. 4). The bumper 12 is carried by a member 11 provided with openings 13 for adjustable connection to the vehicle so as to locate the bumper 12 at a predetermined distance from part 10 of the vehicle. For example, a screw member or the like may extend through one of the openings 13 of member 11 and engage a part of the vehicle to fixedly mount the member 11 and bumper 12 therewith. A body of electrical insulating material 14 is fixed to the inner side of bumper 12 and carries an electrical contact 15 which is located opposite the contact 16 and is connected to the lead 20 of the electrical circuit shown in Fig. 4. The contacts and mountings therefor are protected by a sleeve of rubber or leather, as shown in Fig. 5, against dirt, water, or other undesirable influences.

The electrical circuit which includes the contacts 15 and 16 and the leads 19 and 20 is connected to a source of current such as the battery of the vehicle, and the electrical circuit includes a solenoid 21, the details of which are shown in Fig. 6. Thus, when the bumper 12 is pushed toward the part 10 of the vehicle, when a collision occurs, the contacts 15 and 16 engage each other to energize the solenoid 21.

The latter includes a movable armature 22 fixedly connected to an elongated rod 23 which fixedly carries a ball valve member 25 urged to the closed position shown in Fig. 6 by the spring 24. Thus, when the solenoid 21 is energized, the armature 22 and rod 23 therewith move to the left, as viewed in Fig. 6, so as to move the ball valve member 25 from its seat. This valve member lies in a free space extending between the connection 26, adapted to be connected to a source of pressure fluid, such as air under pressure, and a connection 27, adapted to be connected to the cylinder 8, so that when the valve is opened the fluid pressure will act on the piston 9 to raise the latter and the shaft 3 therewith, as described above. The path of the fluid under pressure must be sealed at all parts thereof, including those parts of the solenoid through which the fluid moves.

In order to remove the armature 22 as much as possible from the static or dynamic influence of the fluid, the armature 22 is formed with axially extending bores 28 through which the fluid passes to equalize the conditions present at opposite sides of the armature.

It is also possible to remove the armature 22 from the influence of the air or other fluid pressure through an arrangement such as that shown in Fig. 7. As is illustrated therein, the fluid path which extends between the connection 29 for the source of fluid pressure and the connection 30 for the cylinder 8 is interrupted by the disc-shaped valve member 31 which is illustrated in Fig. 7 in its closed position, this valve member 31 being fixedly connected to the rod 23 extending from armature 22 for movement therewith to the left as viewed in Fig. 7, against the action of spring 32 when the contacts 15 and 16 engage each other. Thus, at the instant that the solenoid 21 is energized, the valve 31 is moved out of the path extending between connections 29 and 30 so that the pressure fluid may freely move to the cylinder 8. A seal 33 prevents the pressure fluid from entering into the solenoid structure.

It is also possible to prevent fluid from entering the solenoid structure by locating the armature 22, in its rest position, near to the valve so as to pull the valve member from its closed position rather than push the same as shown in Figs. 6 and 7. In this case, the solenoid would be located on the left side of valve 31 of Fig. 7 rather than on the right side thereof, and it is evident that with this arrangement the valve 31 itself would seal the solenoid against the pressure fluid even when the valve is open.

Figure 8:
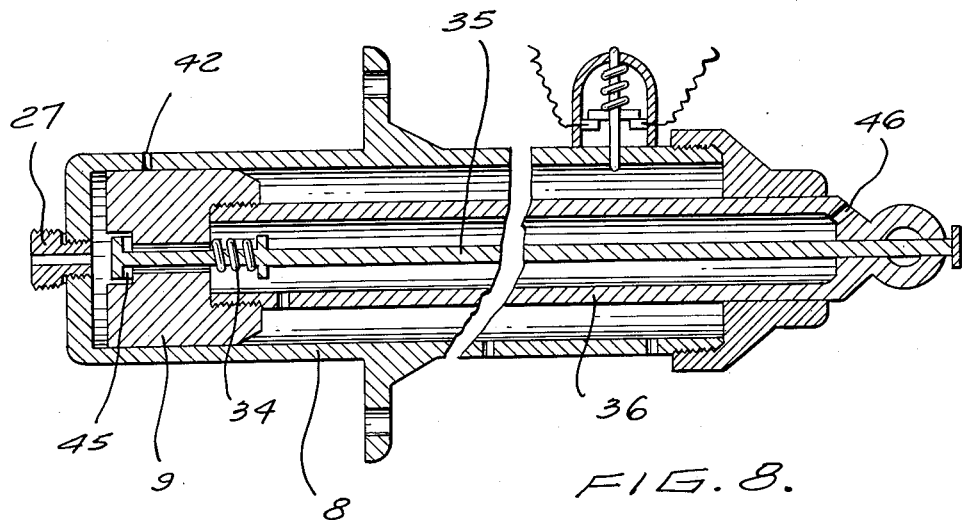
Fig. 8 is a sectional, partly diagrammatic view of a cylinder and piston forming part of the present invention.

The cylinder 8 and piston 9 can be constructed in a conventional manner. It is evident that the piston moves at a great speed which suddenly drops to zero when the piston reaches its topmost end position. In order to prevent any injury or excessive stress on the cylinder and piston, a resilient braking of the piston just before it reaches the top of the cylinder is provided, for example, through the medium of a spring 34 (Fig. 8) which is located about the rod 35, on which the piston 9 is freely movable, and just above the piston so that the movement of piston 9 and its hollow piston rod 36 will be retarded just before the piston 9 reaches the top of the cylinder. Thus, the rod 35 has an extension fixedly connected thereto and against which the spring 34 bears, as shown in Figs. 8 and 9, this extension extending through an axially extending slot formed in the piston rod 36 and engaging the top of the cylinder just before the piston 9 reaches the top of the cylinder so that the spring 34 becomes compressed to brake the movement of the piston 9.

It is pointed out that the shaft 3 is connected at its opposite ends to the eyes at the top end portions of the piston 9, as shown in Fig. 3, and that the seat 1 does not surround the entire top end portion of the piston rod, but instead the seat 1 is provided with cutouts opposite the ends of the shaft 3. The rod 35 associated with each piston 9 extends through the hollow piston rod 36 next to the connection of the piston rod to the shaft 3 and is provided with a handle so that the rod 35 may be manually moved for a purpose described below, this handle being located in the cutout of seat 1 located at the end of shaft 3 so as to be accessible. It is also possible to locate the braking means for the piston outside of the cylinder 8, for example, at the top end of the piston rod between the latter and the shaft 3, and furthermore the braking means may take other forms than a spring, such as for example, a pneumatic device.

Since it is unnecessary to maintain the solenoid 21 energized after the shaft 3 has been raised, it is possible to provide on the cylinder 8 a device for opening the circuit when the shaft 3 has been raised sufficiently. Thus, an interrupting switch for opening the circuit is mounted on the cylinder 8, as shown in Fig. 9, this switch including the actuating pin 37 which carries a contact member 38 and which is urged together with the contact member 38 by a spring, as shown, toward the cylinder 8, this contact 38 being electrically insulated in any suitable way from the spring and pin 37. The contact 38 bridges a pair of contacts 39 and 40 fixed to the switch housing, and these contacts 39 and 40 are inserted in the lead 19 to form an interruption in the same which is normally bridged by the contact 38.

Figure 9:
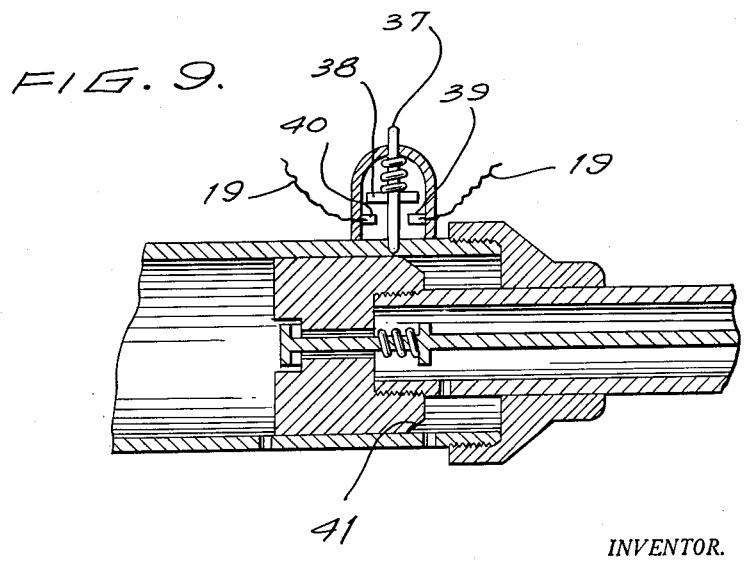
Fig. 9 is a fragmentary view of part of the structure of Fig. 8 illustrated in a position different from that shown in Fig. 8.

The pin 37 extends into the cylinder 8, and the piston 9 is formed at its top periphery with a conical portion 41 which engages the pin 37 and moves the latter to the position shown in Fig. 9 where contact 38 is separated from contacts 39 and 40 so as to interrupt the circuit and deenergize the solenoid 21 so that the flow of air or other fluid to the cylinder 8 ceases. The circuit is then maintained open by any suitable means, such as for example, a switch 50 (Fig. 4) located at the side of the vehicle or at some other position convenient to the person in the position shown in Fig. 2, this switch being manually opened to open the circuit and normally remaining closed.

In order that the piston 9 and the shaft 3 therewith may automatically descend, the cylinder 8 is formed with small openings 42 through which the air or other fluid in the cylinder slowly escapes so that the piston gradually moves down, these openings 42 being too small to permit the rapidly flowing fluid entering the cylinder 8 to flow out of the latter at a rate sufficient to prevent proper operation of the apparatus.

The interrupting switch shown in Figs. 8 and 9 may also be connected to the ignition circuit of the vehicle and to a device for controlling the flow of fuel in the fuel line of the vehicle so as to automatically open the ignition circuit and stop the flow of fuel, so as to prevent fires.

The required fluid under pressure may be air which is stored in suitable tanks 43, or it is possible to obtain the air from a compressor connected to a tank which communicates with the cylinder 8. Thus, the presence of the required air pressure is always assured and may be checked by a suitable pressure guage located on the dash board.

The required air pressure need not be too great because the entire weight of the person is not raised. As is evident from Figs. 1 and 2, the raising force takes place only beneath the knees of the person and the remaining much heavier weight of the person serves to augment the rate with which the seat turns about the shaft 3 from the position of Fig. 1 to that of Fig. 2, until the person is stopped in his movement by the sheet material 7.

While the apparatus is entirely automatic in operation, it is desirable to provide a means for operating the same at will either for testing purposes or to manually set the apparatus into operation when the operator realizes that he will shortly be in a collision which he cannot avoid. For this purpose a switch 44 is connected to the circuit in parallel with the contacts 15 and 16, as is apparent from the wiring diagram of Fig. 4, and this switch 44 may be located, for example, on the dashboard, on the steering wheel or at the floor to be foot operated.

As was mentioned above, the air will slowly escape from the cylinder 8 through the openings 42 thereof so that the piston 9 will automatically descend. However, if it is desired to accelerate the rate with which the piston descends, the person in the position shown in Fig. 2 need only reach over the side of the seat and engage the handle at the top of rod 35 and depress the latter against the action of spring 34. As is apparent from Figs. 8 and 9, the lower end of rod 35 takes the form of a valve member 45 which closes a passage through the piston 9, this valve member being held in its closed position by the spring 34, and the valve member 45 is moved from its closed position so that additional air may escape through the piston into the hollow piston rod 36 and out of the latter through the opening 46 at the top end of the piston rod, as shown at the right-hand part of Fig. 8.

Although one complete structure for carrying out the invention has been described above, it is evident that many variations in this structure may be provided within the purview of the present invention. For example, instead of raising the front part of the seat, it is possible to maintain this front part at the same level and merely allow the rear part of the seat to turn down. This arrangement, however, although it is included within the purview of the present invention, is not preferred because with such an arrangement the person on the seat will only be moved to a position such as that of Fig. 2 by the force of gravity, and this type of action is not as positive and as fast as the above-described structure where the knees of the person are forced upwardly at a very fast rate.

Furthermore, it is not essential that the front part of the seat move vertically upward as shown in the structure described above. It is possible to mount the top front portion of the seat for upward turning movement about an axis located adjacent the back rest of the seat, and this will accomplish results similar to that of the structure described above, so that this arrangement also is included within the invention.

With reference to Fig. 4 it has been described in what manner the circuit may be maintained open, after an initial operation of the apparatus, by means of the switch 50, in order to facilitate the occupant's leaving the tilted seat. The circuit may, however, also be maintained open by means of an automatic device.

Figure 10:
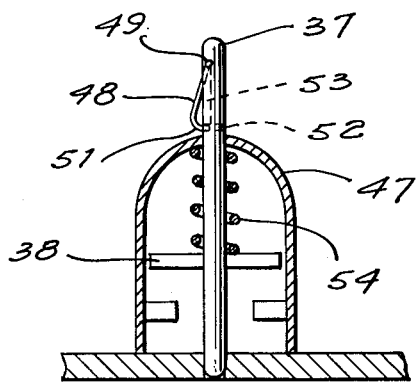
Fig. 10 is a fragmentary sectional view of part of the structure of Fig. 8, being a modification of the device shown in Fig. 9.

Such an automatic device for preventing renewed energizing is shown, by way of example only, in Fig. 10. The interrupter pin 37 provided with the contact member 38, and projecting from the housing portion 47 carries on its upper end a catch 48 consisting of a bent steel wire having its one end 49 fixedly mounted in the pin 37 in such a manner, that its other end 51 is preloaded so that it tends to move outwardly and away from the pin. This free end 51 is bent and projects into a bore 52 provided in the pin 37. With the interrupter pin 37 in the position shown in Fig. 8, the catch 48 is situated in a longitudinal groove 53 formed in the pin 37, so that the interrupter pin 37 may freely move outwardly as soon as the piston 9 with its tapered portion 41 forces it in an outward direction. When the interrupter pin 37 takes the position shown in Fig. 10, the catch 48 springs outwardly under its own resiliency and with its bent end 51 abuts against the housing portion 47. When the piston 9 during its return movement releases the interrupter pin 37, the latter cannot be forced inwardly under the influence of the spring 54 for again making contact. Only after the free end 51 of catch 48 has manually been forced into the bore 52, the spring 54 is able to force the interrupter pin 37 inwardly for reestablishing contact with the contact member 38.

Figure 11:
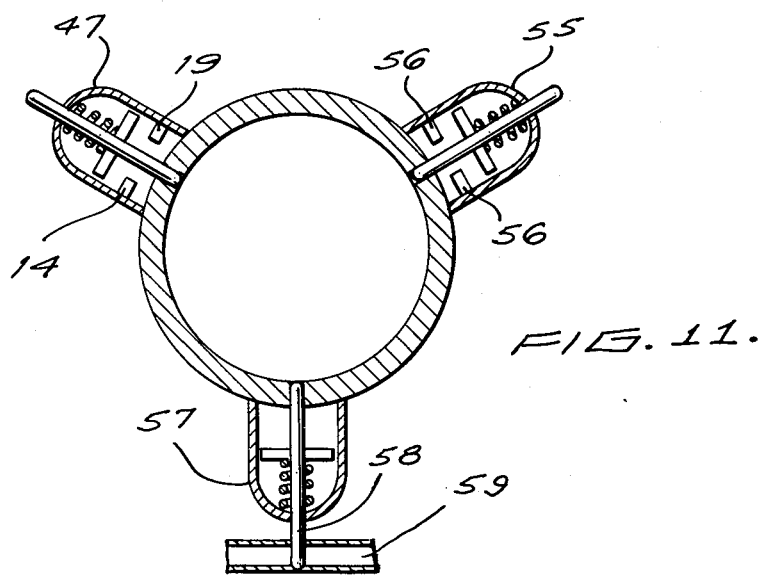
Fig. 11 is a cross-sectional view of a cylinder forming part of the present invention, showing a plurality of interrupter devices corresponding to the device shown in section in Fig. 9.

Fig. 11 shows in what manner a plurality of interrupter devices corresponding to the device shown in Fig. 10 may be provided, for example around the cylinder 8. Thereby the interrupter device 47 may, as described, automatically break the contact instead of breaking it by means of the manually operated switch 50; the interrupter device 55 may further simultaneously interrupt the ignition circuit 56 in the same manner, while the interrupter device 57 with its pin 58 may simultaneously and automatically shut off the fuel line 59 so as to prevent fires, as has already been mentioned.

It may further be mentioned that, if a small compressor 60 is to be used for supplying the compressed air, it is of advantage to connect this compressor directly before the tank 43, so that the latter acts as a surge tank and as a reservoir for storing the compressed air required in the case of danger.

The previously mentioned mercury relays (Fig. 12) for controlling the apparatus may comprise a bent glass tube 61 which is partly filled with mercury 62 and is preferably evacuated. In the tube 61 are provided two contacts 63, 64, the lower contact 64 of which may be immersed in the mercury even when the vehicle is stationary.

This is, however, not absolutely necessary, and the lower contact may also be situated at 65, so that it is outside the mercury 62, when the latter is in the inoperative position. The contact 63 is in any case situated outside the mercury when the latter is in the inoperative position; thus it may be situated beside or above the contact 65.

Figure 12:
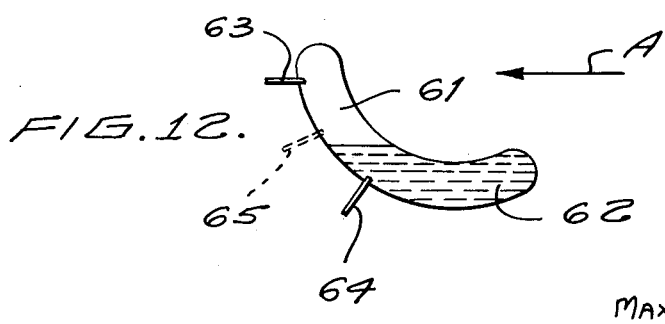
Fig. 12 is a diagrammatic view of a mercury relay, being an embodiment for controlling the apparatus of the present invention.

The direction of motion of the vehicle being as indicated by the arrow A, Fig. 12, the glass tube 61 should have the position shown in Fig. 12. Upon retardation of the speed of the vehicle the mercury 62, due to its inertia, rises in the direction towards contact 63, the curvature of glass tube 61 and the height of contact 63 being so chosen, that the mercury is not able to reach the contact 63 in the case of normal braking deceleration, but rises to the height of contact 63 only in case of excessive, dangerous deceleration. The quantity of mercury contained in the recipient 61 must be so chosen, that the mercury upon reaching contact 63 also engages simultaneously contact 64 or 65 respectively, thus closing the circuit.

The mercury relay may be connected in such a manner, that the contacts 63 and 64 or 63 and 65, respectively, take the place of contacts 15 and 16, so that the latter may be omitted. In any case the mercury relay may be installed at any point of the vehicle, contrary to the contacts 15 and 16.

It will be understood that each of the elements described above, or two or more together, may also find a useful application in other types of safety apparatus for vehicles differing from the types described above.

While the invention has been illustrated and described as embodied in safety apparatus to prevent persons from being thrown forwardly when a collision of a vehicle occurs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Safety apparatus for vehicles comprising, in combination, a seat having a forward part and a rear part; a back rest located adjacent said rear part of said set and being separate from the latter; support means supporting said seat for turning movement about an axis adjacent said forward part thereof; raising means connected to said seat for raising said axis and turning said rear part of said seat downwardly about said axis when the moving speed of the vehicle is suddenly retarded so as to locate said seat more distant from said back rest to provide an appreciable space for the occupant between said back rest and said seat so that he cannot be thrown forwardly; a floor on which said seat is located; and a roller turnably connected to said seat adjacent said rear part thereof and engaging said floor for movement therealong when said axis is raised.

2. Safety apparatus for vehicles comprising, in combination, a seat having a forward part and a rear part; a back rest located adjacent said rear part of said seat and being separate from the latter; support means supporting said seat for turning movement about an axis adjacent said forward part thereof; raising means connected to said seat for raising said axis and turning said rear part of said seat downwardly about said axis when the moving speed of the vehicle is suddenly retarded so as to locate said seat more distant from said back rest to provide an appreciable space for the occupant between said back rest and said seat so that he cannot be thrown forwardly; and actuating means for automatically actuating said raising means when a collision between the front end of the vehicle and another object occurs.

3. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; raising means connected to said seat for raising said axis and turning said rear part of said seat downwardly about said axis when the moving speed of the vehicle is suddenly retarded so as to locate said seat more distant from said back rest to provide an appreciable space for the occupant between said back rest and said seat so that he cannot be thrown forwardly; and actuating means for automatically actuating said raising means when a collision between the front end of the vehicle and another object occurs, said actuating means being connected to the bumper of the vehicle.

4. Safety apparatus for vehicles comprising, in combination, a seat having a forward part and a rear part; a back rest located adjacent said rear part of said seat and being separate from the latter; support means supporting said seat for turning movement about an axis adjacent said forward part thereof; pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly; and actuating means operatively connected to said pressure means for actuating the same when the forward moving speed of the vehicle is suddenly retarded.

5. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly; and actuating means operatively connected to said pressure means for actuating the same when the forward moving speed of the vehicle is suddenly retarded, said actuating means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said pressure means for releasing the same when said solenoid is energized.

6. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly; actuating means operatively connected to said pressure means for actuating the same when the forward moving speed of the vehicle is suddenly retarded, said actuating means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said pressure means for releasing the same when said solenoid is energized; and a switch located in said circuit in parallel with said first and second contacts.

7. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; air pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened; and actuating means operatively connected to said pressure means for actuating the same when the forward moving speed of the vehicle is suddenly retarded, said actuating means comprising a first electrical content located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized.

8. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; air pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; and actuating means operatively connected to said pressure means for actuating the same when the forward moving speed of the vehicle is suddenly retarded, said actuating means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized.

9. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof; air pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; and actuating means operatively connected to said pressure means for actuating the same when the forward moving speed of the vehicle is suddenly retarded, said actuating means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening and moving the same toward said solenoid when the latter is energized.

10. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof, said support means including a shaft extending along said axis, a piston connected to said shaft and extending downwardly therefrom, and a cylinder in which said piston is located; air pressure means operatively connected to said cylinder for raising said piston and said shaft therewith, when said pressure means is actuated, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; and actuating means operatively connected to said pressure means for actuating the same when the forward moving speed of the vehicle is suddenly retarded, said actuating means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized.

11. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof, said support means including a shaft extending along said axis, a piston connected to said shaft and extending downwardly therefrom, and a cylinder in which said piston is located; air pressure means operatively connected to said cylinder for raising said piston and said shaft therewith, when said pressure means is released, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; release means operatively connected to said pressure means for releasing the same when the forward moving speed of the vehicle is suddenly retarded, said release means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized; and switch means connected to said circuit for automatically opening the same when said shaft is raised to a predetermined height.

12. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof, said support means including a shaft extending along said axis, a piston connected to said shaft and extending downwardly therefrom, and a cylinder in which said piston is located; air pressure means operatively connected to said cylinder for raising said piston and said shaft therewith, when said pressure means is released, to turn said rear part of said seat downwardly about said axis to loacte said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; release means operatively connected to said pressure means for releasing the same when the forward moving speed of the vehicle is suddenly retarded, said release means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized; and switch means connected to said circuit for automatically opening the same when said shaft is raised to a predetermined height, said switch means being mounted on said cylinder and extending partly into the same to be actuated by said piston.

13. Safety apparatus for vehicles comprising, in combination, a bumper; a seat having a forward part and a rear part; a back rest located adjacent said rear part of said seat and being separate from the latter; support means supporting said seat for turning movement about an axis adjacent said forward part thereof, said support means including a shaft extending along said axis, a piston connected to said shaft and extending downwardly therefrom, and a cylinder in which said piston is located; air pressure means operatively connected to said cylinder for raising said piston and said shaft therewith, when said pressure means is released, to turn said rear part of said seat downwardly about said axis to locate said seat more distant from said back rest to provide an appreciable space for the occupant between said back rest and seat so that he cannot be thrown forwardly, said air pressure means including a valve to release air under pressure upon being opened, said valve being mounted on said air pressure means for movement in a direction substantially normal to the path of the air leaving said air pressure means when said valve is opened; release means operatively connected to said pressure means for releasing the same when the forward moving speed of the vehicle is suddenly retarded, said release means comprising a first electrical contact located on a front part of the vehicle and facing said bumper, a second electrical contact located on said bumper opposite said first contact to engage the latter when said bumper moves toward said front part of the vehicle, an electrical circuit including said first and second contacts and being adapted to be closed when said contacts engage each other, and a solenoid located in said circuit to be energized upon engagement between said contacts, said solenoid being operatively connected to said valve for opening the same when said solenoid is energized; and valve means mounted on said piston for releasing air from said cylinder and having an operating part located outside of said cylinder so that said valve means may be actuated at will to release air from said cylinder.

14. Safety apparatus for vehicles comprising, in combination, a seat having a forward part and a rear part; a back rest located adjacent said rear part of said seat and being separate from the latter; support means supporting said seat for turning movement about an axis adjacent said forward part thereof; pressure means connected to said seat for raising said axis, when said pressure means is actuated, to turn said rear part of said seat downwardly about said axis to locate said seat more distant from said back rest to provide an appreciable space for the occupant between said back rest and seat so that he cannot be thrown forwardly, said pressure means including a container for compressed air and a compressor operatively connected thereto; and actuating means operatively connected to said pressure means for actuating the same when the forward moving speed of the vehicle is suddenly retarded.

15. Safety apparatus for vehicles comprising, in combination, a seat having a forward part and a rear part; a back rest located adjacent said rear part of said seat and being separate from the latter; support means supporting said seat for turning movement about an axis adjacent said forward part thereof; raising means connected to said seat for raising said axis and turning said rear part of said seat downwardly about said axis when the forward moving speed of the vehicle is suddenly retarded so as to locate said seat more distant from said back rest to provide an appreciable space for the occupant between said back rest and said seat so that he cannot be thrown forwardly; and a length of flexible sheet material connected to said rear part of said seat and said back rest, being slack when said rear part of said seat is adjacent said back rest, and becoming taut when said seat becomes located more distant from said back rest.

16. Safety apparatus for vehicles comprising, in combination, a seat having a forward part and a rear part; a back rest located adjacent said rear part of said seat and being separate from the latter; support means supporting said seat for turning movement about an axis adjacent said forward part thereof; raising means connected to said seat for raising said axis and turning said rear part of said seat downwardly about said axis when the forward moving speed of the vehicle is suddenly retarded so as to locate said seat more distant from said back rest to provide an appreciable space for the occupant between said back rest and said seat so that he cannot be thrown forwardly; actuating means for automatically actuating said raising means when a collision between the vehicle and another object occurs; and means for actuating said raising means at will.

References Cited in the file of this patent

UNITED STATES PATENTS

| | | |
|---|---|---|
| 1,569,502 | Kurtis | Jan. 12, 1926 |
| 1,850,744 | Trapani | Mar. 22, 1932 |
| 2,335,340 | Koppelman | Nov. 30, 1943 |
| 2,433,950 | Henderson | Jan. 6, 1948 |

FOREIGN PATENTS

| | | |
|---|---|---|
| 471,037 | France | July 1, 1914 |
| 1,012,718 | France | Apr. 16, 1952 |